Patented Feb. 10, 1931

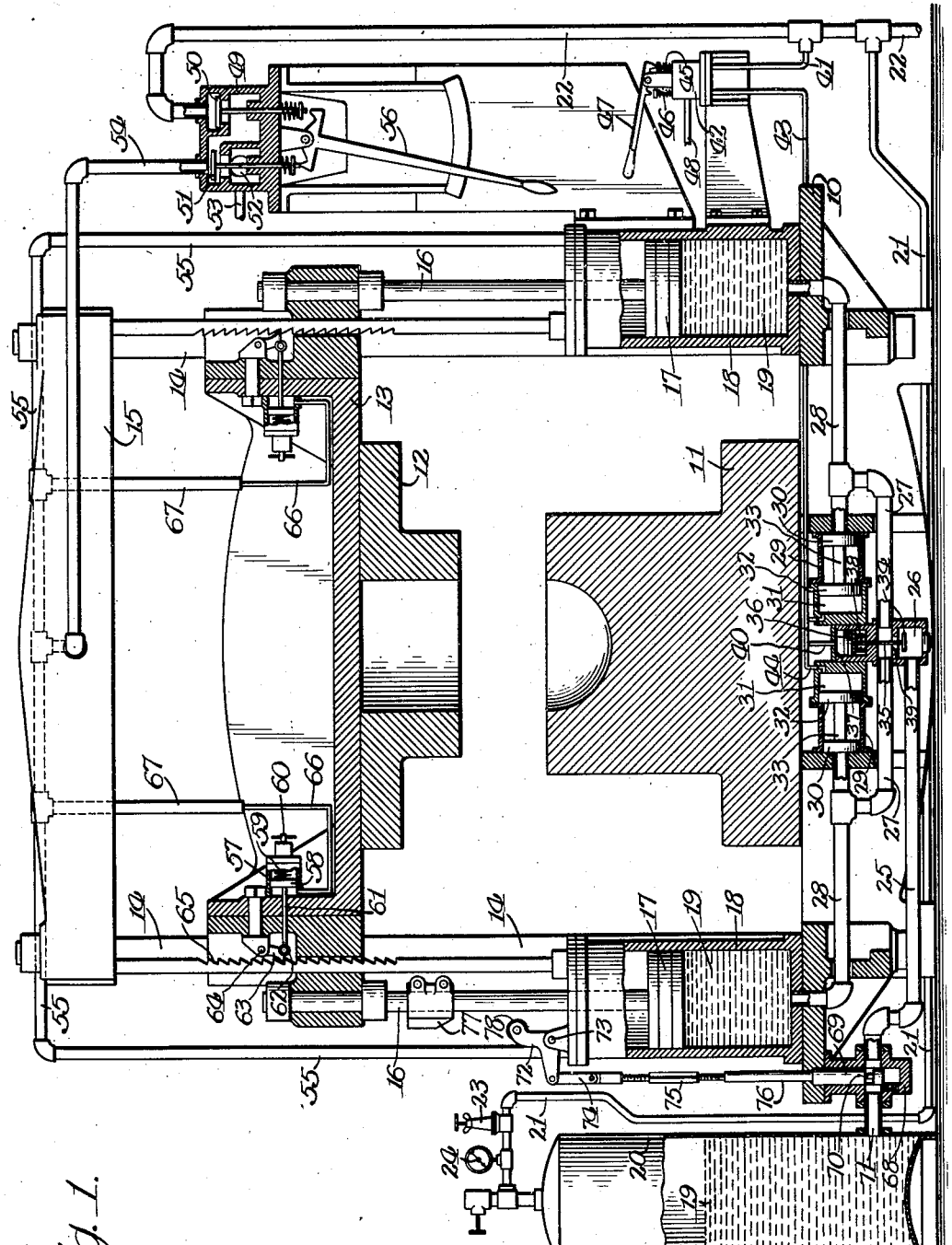

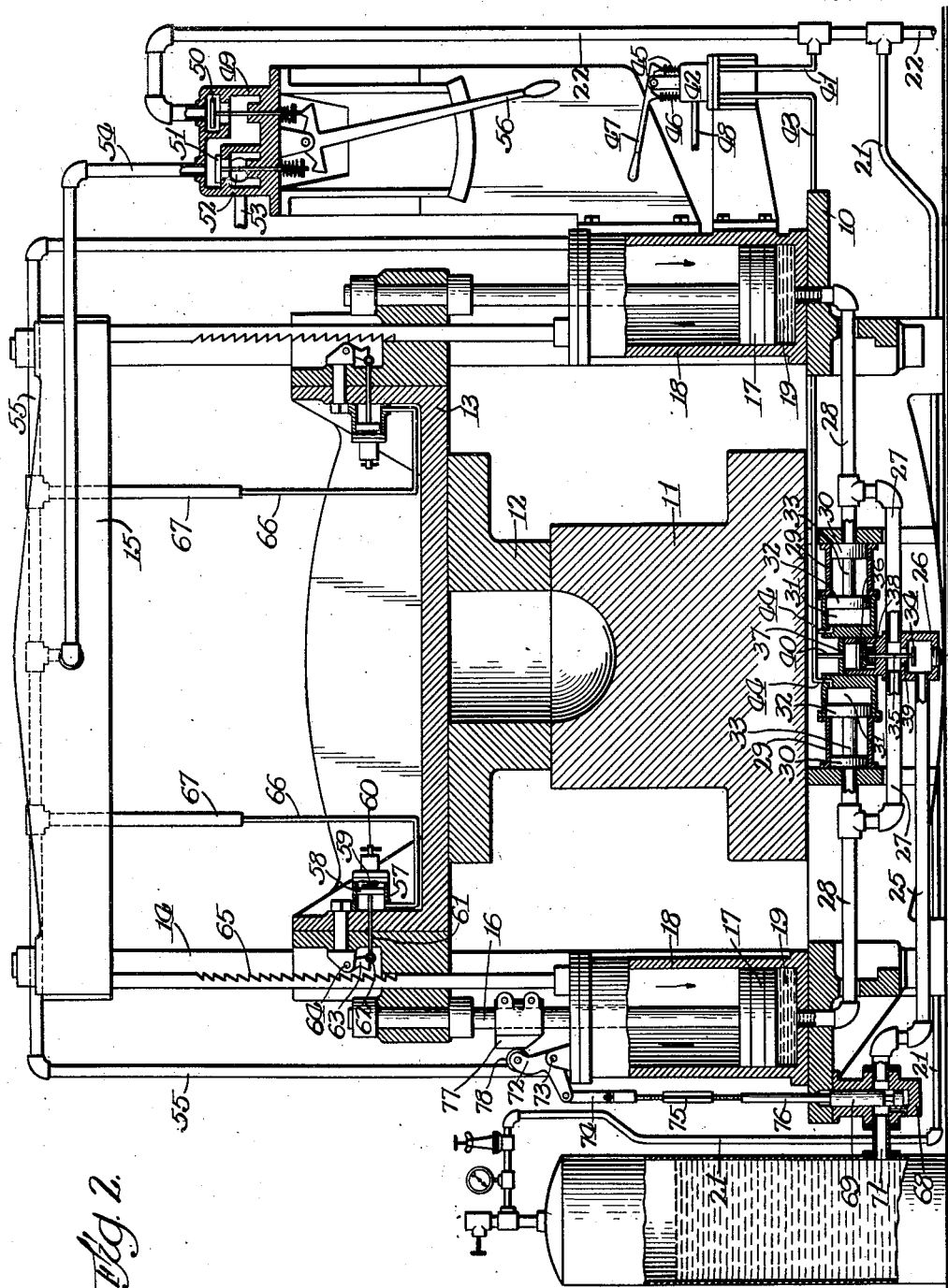

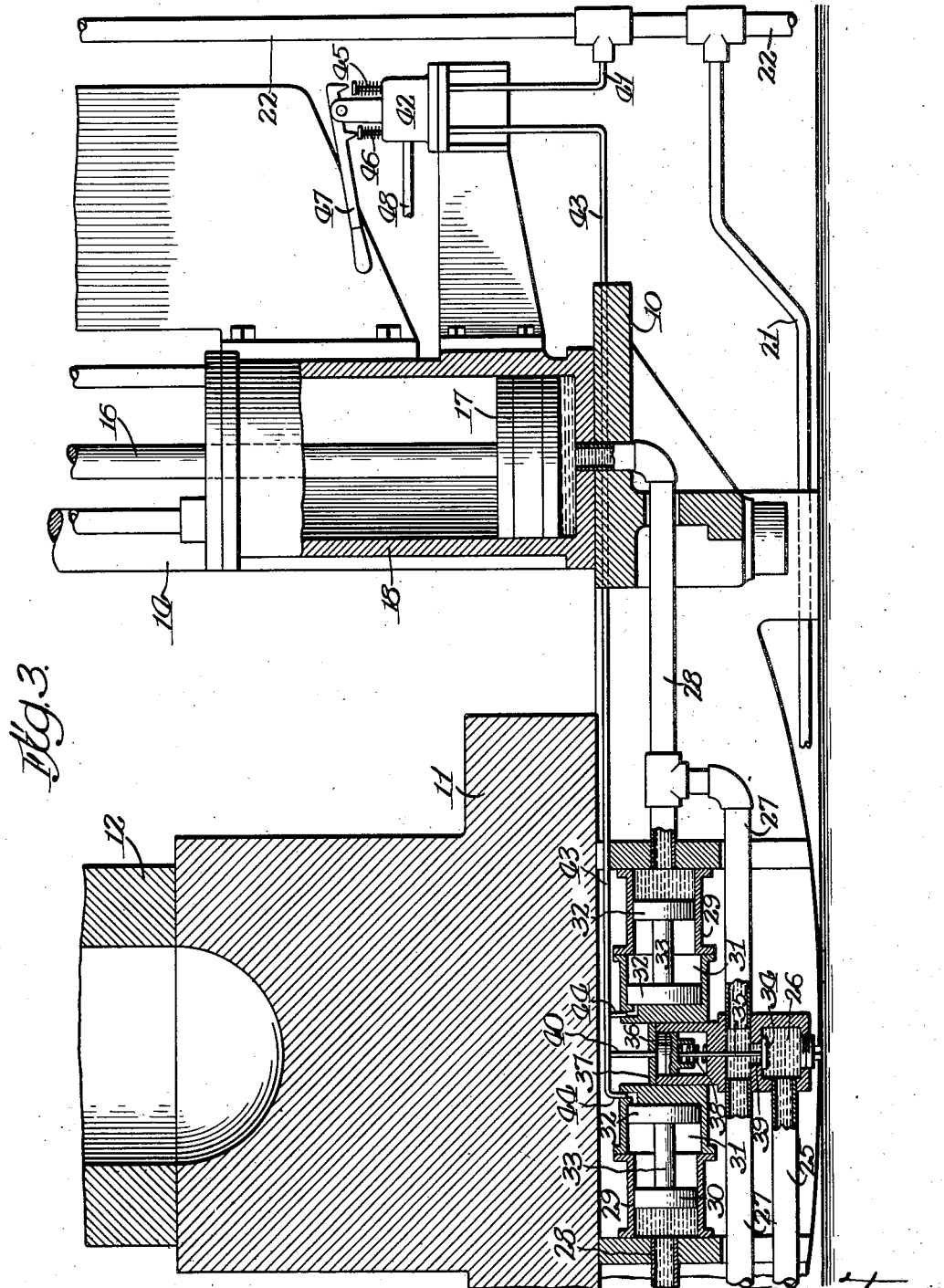

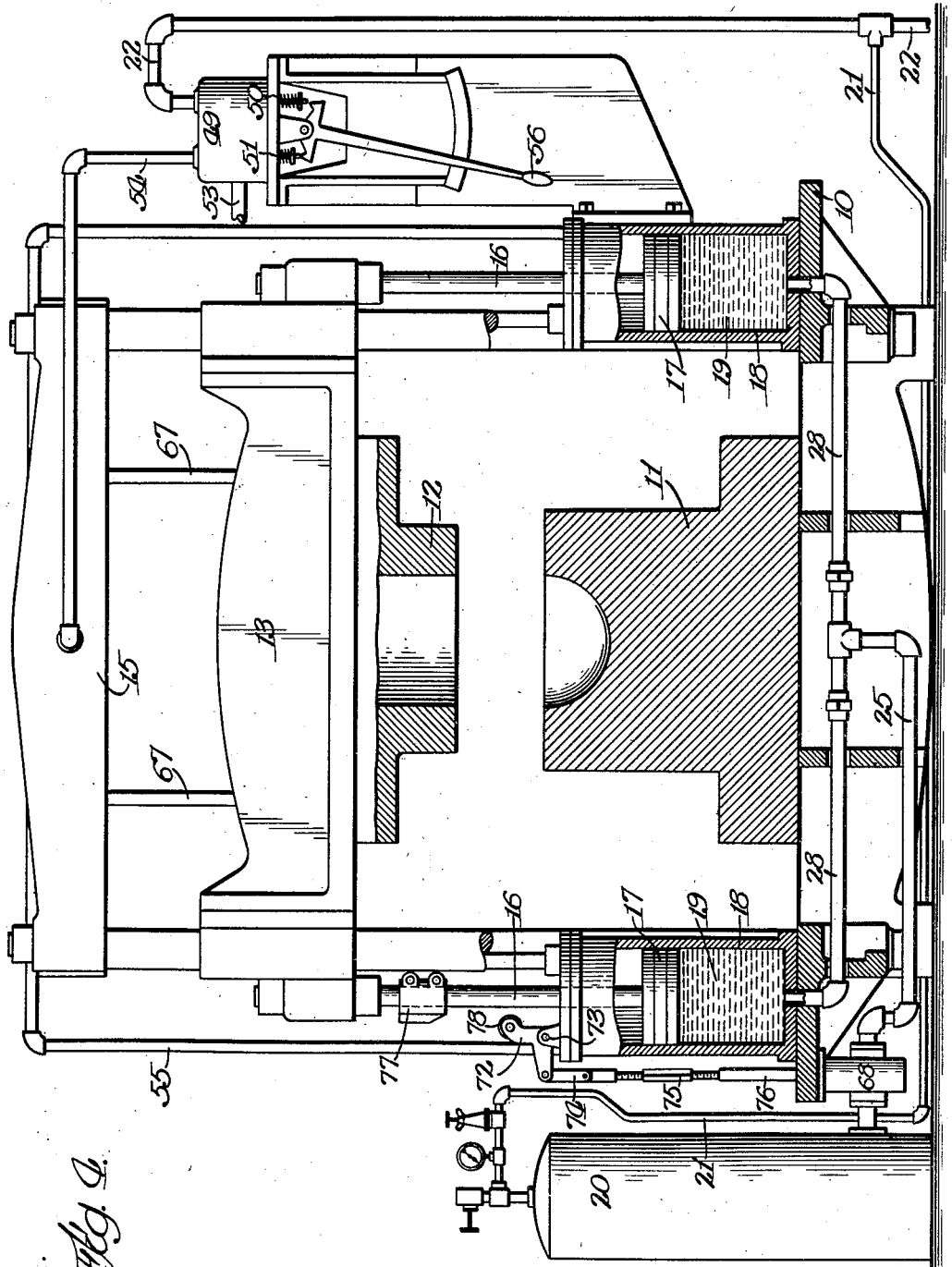

1,791,757

UNITED STATES PATENT OFFICE

RUDOLPH W. GLASNER AND FREDRICH J. RODE, OF CHICAGO, ILLINOIS

DIE-FITTING MACHINE

Application filed October 11, 1929. Serial No. 398,842.

It is well known that in die fitting machines the dies are spotted or fitted by moving one of the dies against the other by means of screws operated in any suitable manner, and then the dies are separated in the same manner, after which the faces are scraped, filed or fitted, the inaccuracies being indicated by the bluing or coating which is placed upon the faces that are to be fitted, before they are brought into contact, the operation being repeated as often as necessary.

This operation is very slow as by means of the use of screw adjusting means the dies do not move rapidly.

To overcome these objections and difficulties and to provide an improved die fitting machine having means for quickly moving the dies into and out of contact with each other by dispensing with the use of the screw adjusting mechanism for that purpose, is one of the objects of the present invention.

A further object is to provide improved means whereby distance adjustment may be eliminated and pressure adjustment will be provided for.

A further object is to provide improved means whereby a quick movement may be imparted to the movable one of the dies until it is brought into close proximity to the other die, and improved means whereby such movement will be automatically arrested or slowed down before the completion of the movement thereof, thereby rendering it possible for the operator to inspect the work to ascertain how the dies will fit.

A further object is to provide in a machine of this character improved means whereby after the dies are brought into contact, additional pressure may be produced to obtain a squeezing operation between the co-operating faces of the dies, for testing purposes, after the movable die has reached the full length of its operative stroke.

A further object is to provide improved means whereby the male and female dies may be brought together for fitting purposes and will exert a pressure one on to the other, which pressure is supplied by a fluid pressure means, the male and female parts of the dies constituting their own stop for the limit of travel, instead of being limited in their travel by some mechanical means such as a screw or other mechanical operating means.

A further object is to provide improved locking means for holding and maintaining the movable die and the movable part of the machine to which it is attached, from dropping or moving out of position until the machine is to be operated, and improved means for automatically rendering the locking means ineffective.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a view partly in elevation, partly in cross section and partly broken away, of a machine of this character constructed in accordance with the principles of this invention and showing the movable die member in an intermediate position on the upstroke thereof.

Figure 2 is a view similar to Figure 1, showing the parts in the position which they will assume when the dies are in contact with each other.

Figure 3 is a detail view partly in elevation, partly in section and partly broken away, of a portion of the machine on a larger scale.

Figure 4 is a view similar to Figure 1, of a modified form of the invention.

Referring more particularly to the drawings and to the form of the invention shown in Figures 1 to 3, the numeral 10 designates the supporting bed of the machine, which is preferably arranged at a low elevation, and upon this bed 10 is mounted one of the die members 11 which is to be fitted.

The other die member 12 is connected with a reciprocable member or ram 13 which is adapted to move upon suitable uprights 14, the latter extending for any desired distance above the bed 10 and being connected at their upper ends by means of a cross head 15.

Connected with the ram 13 in any suitable manner and depending therefrom are piston rods 16, any number of which may be provided, and to these piston rods are connected pistons 17 that are reciprocable in cylinders 18, the latter being supported by the bed 10 of the machine.

Liquid 19 is supplied to the cylinders 18 on the bottom sides therefrom from a suitable tank or container 20 which is supplied with fluid, preferably air, on the top of the liquid 19, from any suitable source through a pipe 21 which is connected with a pipe 22, the latter forming the inlet for the fluid.

Within the pipe 21 may be arranged an automatic regulating valve 23 and an indicator gauge 24.

Leading from the tank or container 20, preferably at a point adjacent the bottom thereof, is a pipe 25 which has communication with a valve chamber 26 and leading from the valve chamber 26 are pipes 27, which in turn are connected with pipes 28, which latter in turn have communication with the respective cylinders 18, preferably through the bottom thereof, so that liquid under pressure will flow from the container 20 into the cylinders 18 to resist the downward movement of the pistons 17 and consequently the ram 13 and die 12 and also to raise the pistons.

Communicating with each of the pipes 28 is a cylinder 29 in which a piston 30 operates and the piston 30 serves as a means for opening and closing the pipes 28.

The cylinder 29 also preferably embodies an enlarged portion 31 in which a piston 32 is reciprocable and the piston 32 is connected by means of a piston rod 33 with the piston 30. The valve chamber 26 is provided with a valve 34 which is connected by means of a stem 35 to a piston 36 movable in a cylinder 37.

The piston 36 is moved in one direction by means of a spring 38 arranged between the piston and the adjacent end of the cylinder 37 and tends normally to move the piston 36 and valve 34 in a direction to close the opening 39 which forms a communication between the valve chamber 26 and the pipes 27.

A suitable fluid, such as air, is admitted into the cylinder 37 above the piston 36 or on the side thereof opposite to the side on which the spring 38 is located so as to operate in opposition thereto. When the pressure of the air upon the piston 36 is sufficient to overcome the stress of the spring 38, the valve 34 will be unseated to open the passage 39 and thereby permit the liquid to flow from the container 20 into the cylinders 18 and vice versa.

In order therefore to control this flow of the liquid it is only necessary to control the operation of the valve 34 which, as before stated, is effected through the medium of fluid pressure. The fluid pressure for that purpose is supplied from the pipe 22 preferably through the medium of a pipe 41 communicating with the valve chamber 42 and leading from the valve chamber 42 is another pipe 43, which has communication with the pipe 40. Similarly the pipe 43 has communication with the cylinders 31 to operate upon the pistons 32 to move the pistons 30 in a direction to close the pipe 28, through the medium of a pipe 44 which also has communication with the pipe 43.

Valves 45—46 are provided in the valve chamber 42 and an operating or control lever 47 is provided for alternately opening and allowing the valves 45—46 to close.

The valve chamber 42 is provided with an exhaust pipe 48 to permit the air or fluid to be exhausted from the cylinders 31 and 37, thereby allowing the pressure of the fluid from the container 22 to open the pipes 28 and the valve 34 to be closed.

It will be manifest that by thus operating the control lever 47 and the valves 45—46 and when the pressure in the cylinders 31 upon the pistons 32 and in the cylinder 37 upon the piston 36 is released, the pistons 30 will be unseated by the pressure of the liquid exerted thereupon by the pistons 17. This will occur when it is desired to produce an extra pressure upon the ram and die 12, after they have reached the limit of their downward movement to produce a squeezing action between the contacting faces of the dies.

However, during the descent of the die 12 until it contacts with the die 11, the air pressure is maintained in the cylinders 31 and 36 and is sufficient to overcome the pressure created upon the liquid 19 in the cylinders.

The ram 13 and die 12 are lowered by means of fluid pressure admitted to the cylinders on the top sides of the pistons 17, and the fluid is supplied through the main supply pipe 22. To that end the pipe 22 is connected with a valve casing 49 having two valves 50—51 therein. The valve 51 controls an outlet 52 to which an exhaust pipe 53 is connected.

Leading from the valve casing 49 is a pipe 54 which connects with another pipe 55 and this pipe in turn has connection with the cylinders 18 on the top sides of the pistons 17.

An operating lever 56 is provided for controlling the valves 50 and 51 and when the parts are in the position shown in Figure 2, the valve 50 will be open and the valve 51 will be closed, thereby closing the exhaust outlet 52 and establishing communication between the pipe 22 and the cylinders 18 on the top side of the pistons 17 through the pipes 54 and 55, with the result that the pressure thus exerted upon the pistons will force them downwardly in the cylinders against the resistance pressure of the liquid 19 until the upper die 12 contacts with the lower die 11. During this movement of the parts the pressure in the cylinders 31 will overcome the pressure upon the liquid in the cylinders 18 and the valve 34 will be held open by the pressure in the cylinder 37 so as to permit the liquid in the cylinders 18 to be discharged back into the container 20 through the pipe 25.

It is at this point in the cycle of operation of the press that it may be desired to create an extra pressure upon the die 12 to exert what might be termed a squeezing action of the dies. To accomplish this the lever 47 is operated so as to connect the pipe 43 with the exhaust outlet 48 (the construction and operation of the valves 42 being the same as the valves 49) so as to release the air pressure in the cylinders 31 and 37, with the result that the spring 38 will move the piston 36 in the cylinder 37 to close the valve 34 and the stress of the spring 38 is sufficient to overcome the pressure upon the liquid 19 and as there is preferably no pressure in the cylinders 31 behind the pistons 32, the pressure upon the liquid 19 in the cylinders 18 will force the liquid from the cylinders through the pipes 28 into the cylinders 29 to displace the pistons 30 and the pistons 32 sufficiently to relieve all of the pressure beneath the pistons 17 in the cylinders 18 so that the pressure upon the top sides of the pistons 17 in the cylinders 18 will squeeze the die 12 against the die 11.

Upon an operation of the lever 47, preferably just as the ram 13 starts to ascend, communication between the pipe 43 and the exhaust 48 will be closed and communication will be established with the air inlet pipe 22 through the pipe 41, valve casing 42 and pipe 43 to create pressure in the cylinders 31 and 37 to seat the pistons 30 against the open ends of the pipes 28 and open the valve 34, thereby again establishing communication between the cylinders 18 and the container 20, with the result that as the pistons 17 rise the pressure in the container 20 above the liquid 19 will cause the liquid to flow into the cylinders 18 beneath the pistons 17.

When the ram 13 and die 12 ascend, means are provided for supporting the ram and the connected parts or holding it from dropping down, and to that end locking devices are provided which may be of any desired and suitable type, but preferably of the fluid controlled type. Any number of these locking devices may be employed and as the construction and operation is the same the specific description of one will apply to each of them.

The locking device preferably embodies a cylinder 57 in which is arranged a piston 58 movable in one direction by means of a spring 59 adapted to be adjusted by means of an adjusting device 60. Connected with the piston is a rod 61 which in turn is connected as at 62 with a locking dog 63 pivotally supported as at 64, and this dog co-operates with a rack 65.

The cylinder 57 on the side of the piston 58 opposite to the side on which the spring 59 is located has communication preferably with the pipe 55 preferably through the medium of telescoping pipe sections 66—67 so that when fluid pressure is admitted into the cylinder 57 the piston 58 will be moved against the stress of the spring 59 to move the pawl 63 out of engagement with the rack teeth 65. When pressure is relieved in this cylinder the spring 59 moves the pawl or dog 63 so that it will engage the rack teeth. The cylinder 57 being connected with the supply pipe 52—22, it will be manifest that when the lever 56 is operated and moved to the position shown in Figure 2, fluid pressure will be admitted into the cylinder 57 at the same time that it is admitted to the cylinders 18 on the top sides of the pistons 17, with the result that the dogs 53 will be released so that the ram 13 can be lowered.

Obviously when the lever 56 is moved to the position in Figure 1, to permit the fluid pressure to escape from the cylinders 18 on the top sides of the pistons 17 the fluid will also escape from the cylinders 57 to permit the springs 59 to become active.

Thus it will be seen that the ram 13 will be automatically locked and unlocked at predetermined times in the cycle of operation of the mechanism.

The mechanism thus described is adapted to lower the ram 13 and die 12 so that the die 12 will contact with the die 11 at any desired rate of speed, according to the amount of pressure which is admitted on the top sides of the pistons 17.

However, in a device of this character it is advisable to cause the die 12 to rapidly approach the die 11 and then to decrease the speed of movement of the die 12 so as to give the operator an opportunity of inspecting the faces of the work which are brought into contact. Therefore, means are provided for automatically decreasing the speed of movement of the ram 13 and die 12 at a predetermined point in the cycle of movement thereof.

To that end there is provided a valve casing 68 which is provided in the pipe 25. A valve 69 is mounted in the casing 68 and this valve is preferably of a cylindrical type having a reduced portion 70 adapted to be moved with respect to the openings in the valve casing 68 with which the pipe 25 and a pipe 71 leading to the container 20 have communication.

As shown in Figure 1, the valve 69 is in a position to open communication between the pipe 25 and the container 20 to the fullest extent, thereby permitting the liquid to flow freely from the cylinders 18 under the pressure of the pistons 17 back into the container 20 and vice versa.

When, however, it is desired to retard the speed of movement of the ram 13 and die 12, it is only necessary to restrict its communicating passage and to that end the valve 69 is adapted to be moved from the position shown in Figure 1 to the position shown in Figure 2, or to any intermediate position as desired. It is desirable, however, that the valve 69 shall not completely close such communicating passage, but should operate so as to restrict such passage and thereby retard the flow of the liquid back into the container 20.

The extent of retardation may be controlled by the position which it is desired that the valve 69 shall assume. This is accomplished in the following manner and the valve 69 may be operated in any suitable manner. A simple and efficient means embodies a bell crank lever 72 which is pivotally mounted as at 73 upon a suitable support, preferably upon the top of one of the cylinders 18. One end of this lever is connected by means of a link 74 with one end of a turn buckle construction 75, and the other end of the turn buckle construction is connected with a rod 76 forming an extension of the valve 69. Thus by rocking the bell crank lever 72 the valve 69 will be reciprocated and by adjusting the turn buckle construction 75 the extent of such movement of the valve 69 by the rocking of the bell crank lever 72 may be varied.

It is desired that this valve 69 shall be automatically operated at a predetermined time in the cycle of movement of the ram 13 and die 12 and to that end there is provided a cam member 77 which is preferably secured to and adjustably supported by one of the piston rods 16, and so arranged that when it contacts with an anti-friction roller 78 on the bell crank lever 72 the latter will be rocked in one direction. When the cam 77 moves out of contact with the bell crank lever a suitable spring operates to move the bell crank lever in the opposite direction.

It is thought from the above description that the operation will be clearly understood, but briefly stated it is as follows.

Assuming the parts to be in the position shown in Figure 1, which is the position they will assume when the ram 13 and die 12 are in an intermediate position or just before they reach the limit of their upward movement, the valve 50 will be closed and the valve 51 will be open while the cylinders 31 and 37 will be out of communication with the exhaust 48 and in communication with the air inlet supply pipe 22, while the valve 69 will be at the limit of its upward movement to fully open the passage between the pipe 25 and the container 20 and the interior of the cylinders 57 will be in communication with the atmosphere through the exhaust pipe 53 so as to permit the springs 59 to operate upon the dogs 63 to cause them to engage the respective racks 65.

During this operation it will be manifest that communication between the cylinders 18 and the container 20 will be established so that the fluid under the pressure in the container 20 which is supplied through the pipe 21 will cause the liquid 19 to flow into the cylinders 18, the valve 34 being opened.

When it is desired to lower the ram 13 and die 12 the lever 56 is moved to the position shown in Figure 2 so as to establish communication between the air supply pipe 22 and the tops of the cylinders 18 and also between the cylinders 57 and the air supply pipe to release the dogs 63 thereby permitting the ram 13 and die 12 to descend through the medium of the pressure on the top sides of the pistons 17 in the cylinders 18.

During this movement the liquid will be forced from the cylinders 18 back into the container 20 and as the ram 13 and die 12 approach the die 11, the speed of movement thereof will be retarded at the time when the cam 77 rocks the bell crank lever 72 to shift the valve 69 from the position shown in Figure 1 to the position shown in Figure 2, to restrict the passage back to the container 20 and thereby retard the flow of liquid thereinto, which will in turn retard the movement of the die 12 and ram 13. This retardation of movement will continue until the die 12 abuts the die 11 which will be at the limit of the strike of the press. To produce an extra movement of the ram 13 and die 12 to obtain a squeezing action between the dies, the lever 47 is operated so as to establish communication between the cylinders 37 and 31 with the atmosphere to reduce the fluid pressure in such cylinders, thereby relieving pressure of the liquid 19 on the bottom sides of the pistons 17 which is accomplished by reason of the fact that the pistons 30 will be moved under air pressure on the top thereof to permit the fluid 19 to flow into the cylinders 29.

To return the ram 13 and die 12 the lever 47 is again operated so as to re-establish fluid pressure in the cylinders 31 and 37 and open the valve 34. The lever 56 may then be operated to relieve the fluid pressure on the top sides of the pistons 17, thereby permitting the liquid to flow from the container 20 under the pistons 17 to raise them and when the cam 77 passes out of engagement with the bell crank lever 72, additional fluid will be admitted into the cylinders 18 to accelerate the rising movement of the ram 13 and die 12, the locking dogs 63 being rendered active at the same time that the fluid pressure is released from the top sides of the pistons 17.

In the form of the invention shown in Figure 4, the means for producing the extra or squeezing pressure of the dies 12 and 11 against each other has been omitted, and communication is established directly from the bottoms of the cylinders 18 with the container 20 through the pipe 25 with which each of the pipes 28 are directly connected. In all other respects the construction and operation of the form of apparatus shown in Figure 4 is the same as the machine shown in the remaining figures.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. A die fitting machine embodying means for moving one die towards another at a predetermined rate of speed, hydraulic means operating in opposition to the first said means, and means for automatically varying the pressure exerted by said hydraulic means, at a predetermined time in the cycle of operation of the press, to vary the rate of speed of movement of the movable die under the influence of the first said means.

2. A die fitting machine embodying fluid pressure for moving one die towards another at a predetermined rate of speed, hydraulic means operating in opposition to the first said means, and means for varying the pressure exerted by said hydraulic means at a predetermined time in the cycle of operation of the press to vary the rate of speed of movement of the movable die under the influence of the first said means.

3. A die fitting machine embodying means for moving one die towards another, said means embodying a reciprocable member having a set throw, hydraulic means operating in opposition to the first said means, means for varying the pressure exerted by the said hydraulic means, at a predetermined time in the cycle of operation of the press, to vary the rate of speed of movement of the movable die under the influence of the first said means, and means for relieving the pressure of the hydraulic means whereby the movement of said reciprocable member and die will be increased beyond the limit of movement for which they have been set, to effect a squeezing action between the die members.

4. A die fitting machine embodying means for moving one die towards another at a predetermined rate of speed, hydraulic means operating in opposition to the first said means, and means responsive to the movement of the movable die for automatically varying the pressure exerted by said hydraulic means, at a predetermined time in the cycle of operation of the press, to varying the rate of speed of movement of the movable die under the influence of the first said means.

5. A die fitting machine embodying means for moving one die towards another, said means embodying a reciprocable member having a set throw, hydraulic means operating in opposition to the first said means, means responsive to the movement of the movable die for varying the pressure exerted by the said hydraulic means, at a predetermined time in the cycle of operation of the press, to vary the rate of speed of movement of the movable die under the influence of the first said means, and means for relieving the pressure of the hydraulic means whereby the movement of said reciprocable member and die will be increased beyond the limit of movement for which they have been set, to effect a squeezing action between the die members.

6. A die fitting machine embodying means for moving one die towards and into contact with another die, said means embodying relatively movable cylinder and piston elements, pneumatic means for relatively moving the cylinder and piston elements and operating on one side of the piston, liquid means for resisting the relative movement of the cylinder and piston elements and operating on the other side of the piston, and means operable at a predetermined time in the cycle of operation of the machine to vary said resistance pressure for varying the speed of movement of the movable die.

7. A die fitting machine embodying means for moving one die towards and into contact with another die, said means embodying relatively movable cylinder and piston elements, fluid means for relatively moving the cylinder and piston elements and operating on one side of the piston, liquid means for yieldingly resisting the relative movement of the cylinder and piston elements and operating on the other side of the piston, and means responsive in its operation to the movement of said movable die for varying the said resistance pressure to vary the speed of movement of said movable die.

8. A die fitting machine embodying means for moving one die towards and into contact with another die, said means embodying a reciprocable member having a set throw, means for automatically varying the rate of speed of such movement at a predetermined time in the cycle of movement of the reciprocable member, and means for increasing the movement of said member beyond the limit of the movement for which it has been set, to effect a squeezing action between the die members.

9. A die fitting machine embodying a movable die carrying member, means for moving said die towards and into contact with another die, said means embodying relatively movable cylinder and piston elements, means for exerting fluid pressure on one side of said piston for resisting such relative movement, means for exerting another and different fluid pressure on the other side of the piston to effect such relative movement against such resistance pressure, for moving the dies into contact, and means for releasing said resistance pressure whereby the fluid pressure on the opposite side of the piston will effect a squeezing action between said dies.

10. A die fitting machine embodying a movable die carrying member, means for moving said die towards and into contact with another die, said means embodying relatively movable cylinder and piston elements, means for exerting fluid pressure on one side of said piston for resisting such relative movement, means for exerting a fluid pressure on the other side of the piston to effect such relative movement against such resistance pressure, for moving the dies into contact, means for releasing said resistance pressure whereby the fluid pressure on the opposite side of the piston will effect a squeezing action between said dies, and means for automatically effecting a variation in the rate of speed of the movement of the movable die towards the other die, at a predetermined time in the cycle of movement of the said die carrying member.

11. A die fitting machine embodying a movable die carrying member, relatively movable cylinder and piston elements one of which is connected with said member, means for exerting fluid pressure on one side of the piston to effect such relative movement, a container for maintaining a liquid column on the other side of the piston for resisting the relative movement of the cylinder and piston elements, a communicating passage between the container and said cylinder, and means for automatically controlling said passage whereby the rate of speed of movement of said die carrying member will be varied at a predetermined time in the cycle of movement of the said member.

12. A die fitting machine embodying a movable die carrying member, relatively movable cylinder and piston elements one of which is connected with said member, means for exerting fluid pressure on one side of the piston to effect such relative movement, a container for maintaining a liquid column on the other side of the piston for resisting the relative movement of the cylinder and piston elements, a communicating passage between the container and said cylinder, means for automatically controlling said passage whereby the rate of speed of movement of said die carrying member will be varied at a predetermined time in the cycle of movement of the said member, and means whereby the time of variation of such rate of speed of movement of the die carrying member in the cycle of its movement may be varied.

13. A die fitting machine embodying means for moving one die towards another at a predetermined rate of speed, hydraulic means operating in opposition to the first said means, means for automatically varying the pressure exerted by said hydraulic means, at a predetermined time in the cycle of operation of the press, to vary the rate of speed of movement of the movable die under the influence of the first said means, locking means for restraining said movable die against movement by the first said means, and means for rendering said locking means inactive.

14. A die fitting machine embodying means for moving one die towards another at a predetermined rate of speed, hydraulic means operating in opposition to the first said means, means for automatically varying the pressure exerted by said hydraulic means at a predetermined time in the cycle of operation of the press, to vary the rate of speed of movement of the movable die under the influence of the first said means, locking means for restraining said movable die against movement by the first said means, and fluid pressure controlled means for rendering said locking means inactive.

In testimony whereof we have signed our names to this specification, on this 30th day of September, A. D. 1929.

RUDOLPH W. GLASNER.
FREDRICH J. RODE.